Feb. 14, 1950 P. J. RIEPPEL 2,497,629
SHIELDED ARC WELDING
Filed Dec. 10, 1948

INVENTOR
PERRY J. RIEPPEL
BY
ATTORNEYS

Patented Feb. 14, 1950

2,497,629

UNITED STATES PATENT OFFICE 2,497,629

SHIELDED ARC WELDING

Perry J. Rieppel, Worthington, Ohio, assignor, by mesne assignments, to Air Reduction Company, Incorporated, New York, N. Y., a corporation of New York Application December 10, 1948, Serial No. 64,496

11 Claims. (Cl. 219—10)

This invention relates to electric arc welding and particularly to improvements in the method of welding whereby advantageous results are secured in an economical manner.

Electric arc welding is conducted by maintaining an arc between a suitable electrode and the workpiece. In its simplest form, the arc is maintained in the normal atmosphere and the presence of oxygen and nitrogen of the atmosphere produces undesirable results in the weld. Improvements have been effected heretofore by shielding the arc with inert gases and by socalled "submerged arc" welding in which the end of the electrode is disposed within a molten flux. These procedures have certain disadvantages and are relatively expensive.

It is the object of the present invention to provide a method of electric welding wherein the arc is shielded effectively and economies in the procedure are accomplished without deterioration of the weld produced.

Figure 1:
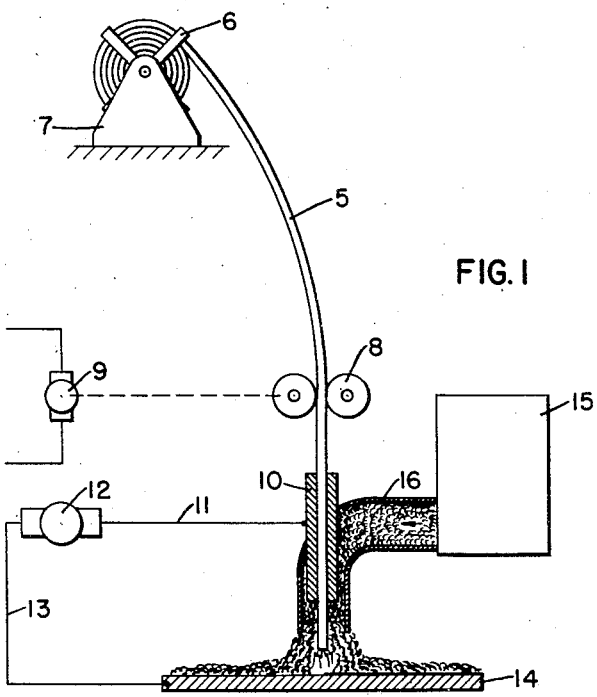
Figure 2:
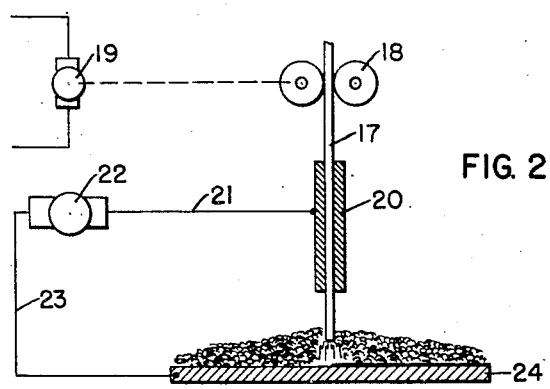

Other objects and advantages of the invention will be apparent as it is better understood by reference to the following specification and accompanying drawing, in which Fig. 1 illustrates diagrammatically an apparatus suitable for the practice of the invention and the nature of the procedure; and Fig. 2 illustrates a simplified form of the apparatus.

I have discovered that electric arc welding may be conducted advantageously under protection of a layer of foam which surrounds the arc and excludes atmospheric gases therefrom. The foam used is of the type heretofore widely employed as a fire extinguishing agent, particularly in connection with oil fires, as described, for example, in the patent to Walter Palmer, No. 1,591,401 issued July 6, 1926. Such foam is produced by the addition to water of a pulverized mixture of sodium bicarbonate and aluminum sulphate containing a stabilizer such as extract of soap bark, extract of licorice root, extract of oak bark, or secondary extract of logwood. These and similar materials included in the composition ensure the production of a tough foam which does not break easily and remains stable for a considerable time. The gaseous content of the foam as described is carbon dioxide produced by reaction of the chemical ingredients. This is suitable in many cases for protecting the weld produced by an electric arc from atmospheric gases.

The invention is not limited, however, to the production of the foam in the particular manner indicated, nor the presence of carbon dioxide therein. It is possible to produce similar foams with carbon monoxide, argon, helium or other shielding gases, for example by beating the gas into a liquid containing a suitable stabilizing agent such as those hereinbefore described. Thus a stiff and stable foam containing any of the gases mentioned or any other suitable gas may be produced easily and applied in accordance with the present invention to improve the welding operation by protecting the weld from atmospheric gases. The method and apparatus for producing the foam form no part of the present invention.

The foam may, moreover, serve as a carrier for various weld stabilizing agents such as silicon tetrachloride, titanium tetrachloride, titanium tetrafluoride, calcium fluoride, alkali metal silicates, titanium dioxide, manganese dioxide, boron tetrafluoride, charcoal, cellulose, iron oxide and calcium carbonate and alloying agents such as ferroalloys of manganese, chromium, molybdenum, vanadium, silicon and metals such as aluminum and nickel. These materials in finely divided form can be suspended in the foam and by the action of the arc are transferred to the finished weld to improve the characteristics thereof.

Referring to the drawing, 5 indicates an electrode of the consumable type which is withdrawn from a reel 6 on a support 7 and fed by rollers 8 driven by a motor 9 at a rate comparable with the consumption of the electrode. The electrode passes through a current pickup shoe 10 which is connected by a conductor 11 to one pole of a welding generator 12. The other pole is connected by a conductor 13 to the workpiece 14. Thus, when the procedure is in operation, an arc is maintained between the end of the electrode 5 and the workpiece to afford the heat necessary for the weld.

In accordance with the present invention, foam is produced in a generator 15, the details of which form no part of the present invention, and is delivered continuously through a pipe 16 which surrounds a portion of the current pickup shoe 10 so that the foam is delivered uniformly about the end of the electrode 5 and spreads out on the workpiece, affording a blanket for the arc and the weld as it is produced. Thus, the gases of the atmosphere are excluded from the weld, and suitable and satisfactory welding operations can be conducted without the imperfections which are commonly met in welds where the atmospheric gases have access to the heated metal.

In the simplified form of the invention as shown in Fig. 2, the electrode 17 may be fed by rollers 18 driven by a motor 19 at the required rate. It passes through a current pickup shoe 20 which is connected by a conductor 21 to one pole of a welding generator 22. The other pole is connected by a conductor 23 to the workpiece 24. Instead of supplying foam continuously as in Fig. 1, the foam is merely spread as a blanket over the workpiece, as indicated in Fig. 2, and the electrode passing through the top of the blanket affords an arc which is completely shielded by the blanket of foam during the welding operation.

While the invention is described more particularly with reference to the use of a consumable electrode, consisting of the metal to be added to the weld, the electrode may be of the non-consuming type such as tungsten, carbon or the like. In that event, the feeding rolls 8 and 18 are unnecessary and current is supplied through the current pickup shoes 10 and 20, precisely as in the case of a consumable electrode. The blanket of foam protects the weld in the same manner in either case.

The foam employed for the purpose of the present invention consists of the selected gas in the form of a multiplicity of bubbles in an aqueous medium, preferably including a foam stabilizing material of the type described. It may include other materials, and particularly arc or weld stabilizing materials or alloying materials suspended in the foam for the purpose of modifying the characteristics of the weld. As indicated, the foam may be supplied continuously from a generator or it may be merely spread over the surface of the workpiece to attain the same result. Any suitable foam-generating equipment may be utilized. One type of such equipment is disclosed in the patent to Palmer hereinbefore mentioned, but other devices for producing foam are well known in the art and any of them are adapted for the purpose of the present invention.

Various changes may be made in the apparatus as described without departing from the invention or sacrificing the advantages thereof.

I claim:

1. The method of electric arc welding which comprises maintaining an arc by supplying electric current from a source and surrounding the arc with a blanket of foam including a gaseous medium.

2. The method of electric arc welding which comprises maintaining an arc by supplying electric current from a source and continuously feeding to and surrounding the arc with a blanket of foam including a gaseous medium.

3. The method of electric arc welding which comprises maintaining an arc by supplying electric current from a source and surrounding the arc with a blanket of foam consisting of a gas in the form of a multiplicity of bubbles in an aqueous medium containing a foam stabilizing agent.

4. The method of electric arc welding which comprises maintaining an arc by supplying electric current from a source and continuously feeding to and surrounding the arc with a blanket of foam consisting of a gas in the form of a multiplicity of bubbles in an aqueous medium containing a foam stabilizing agent.

5. The method of electric arc welding which comprises maintaining an arc by supplying electric current from a source and surrounding the arc with a blanket of foam containing a gas and a weld modifying element suspended therein.

6. The method of electric arc welding which comprises maintaining an arc by supplying electric current from a source and continuously feeding to and surrounding the arc with a blanket of foam containing a gas and a weld modifying element suspended therein.

7. The method of electric arc welding which comprises maintaining an arc by supplying electric current from a source and surrounding the arc with a blanket of aqueous foam containing a gas and a weld modifying element suspended therein.

8. The method of electric arc welding which comprises maintaining an arc by supplying electric current from a source and surrounding the arc with a blanket of aqueous foam consisting of bubbles of carbon dioxide.

9. The method of electric arc welding which comprises maintaining an arc by supplying electric current from a source and surrounding the arc with a blanket of aqueous foam consisting of bubbles of helium.

10. The method of electric arc welding which comprises maintaining an arc by supplying electric current from a source and surrounding the arc with a blanket of aqueous foam consisting of bubbles of argon.

11. The method of electric arc welding which comprises maintaining an arc by supplying electric current from a source and surrounding the arc with a blanket of aqueous foam consisting of bubbles of carbon monoxide.

PERRY J. RIEPPEL.

REFERENCES CITED

The following references are of record in the file of this patent:

UNITED STATES PATENTS

| Number | Name | Date |
| --- | --- | --- |
| 904,482 | Howell | Nov. 17, 1908 |
| 1,309,696 | Roberts et al. | July 15, 1919 |
| 1,746,081 | Hobart | Feb. 4, 1930 |
| 1,746,191 | Devers | Feb. 4, 1930 |
| 2,043,960 | Jones et al. | June 9, 1936 |
| 2,111,226 | Russell | Mar. 15, 1938 |
| 2,121,693 | Henderson | June 21, 1938 |
| 2,311,669 | Kepfer | Feb. 23, 1943 |